United States Patent [19]

Moore

[11] Patent Number: 4,563,621
[45] Date of Patent: Jan. 7, 1986

[54] SPEED CONTROL CIRCUIT FOR GOLF CARTS AND THE LIKE

[75] Inventor: Armistead M. Moore, Houston, Tex.

[73] Assignee: Travis Electronics, Inc., Houston, Tex.

[21] Appl. No.: 665,913

[22] Filed: Oct. 29, 1984

Related U.S. Application Data

[63] Continuation-in-part of Ser. No. 559,107, Dec. 7, 1983, abandoned.

[51] Int. Cl.$^4$ .............................................. H02P 1/10
[52] U.S. Cl. .................................. 318/139; 318/257; 318/442
[58] Field of Search ............... 318/111, 83, 139, 256, 318/257, 268, 287, 301, 305, 442; 307/48

[56] References Cited

U.S. PATENT DOCUMENTS

| | | | |
|---|---|---|---|
| 3,188,543 | 6/1965 | Colvill et al. | 318/397 X |
| 3,241,019 | 3/1966 | Gross | 318/139 |
| 3,243,678 | 3/1966 | Frier | 318/412 X |
| 3,696,279 | 10/1972 | Gyori | 318/139 |
| 3,702,959 | 11/1972 | Le Gloan | 318/139 |
| 3,818,293 | 6/1974 | Wood et al. | 318/139 |
| 3,984,744 | 10/1976 | Moody | 318/442 |

*Primary Examiner*—Bernard Roskoski
*Assistant Examiner*—Bentsu Ro
*Attorney, Agent, or Firm*—Vaden, Eickenroht, Thompson & Jamison

[57] ABSTRACT

A special control circuit for a golf cart or like vehicle powered by a plurality of storage batteries. The batteries are connected circuitwise to a DC motor by speed control contactors to select battery connections in parallel, parallel/series and series for motor speed control. The speed control contactors are arranged so that their solenoids are de-energized at series battery connection and in parallel battery connection charges are normalized across the batteries. Moreover, the circuit provides different sets of parallel/series batteries for intermediate speed to equalize battery change levels. A safety circuit feature prevents the motor in reverse directional operation from being shifted from the low speed settings. Discharge of any battery below minimum operating voltage de-energizes the solenoids of the contactors to stop the vehicle.

7 Claims, 1 Drawing Figure

SPEED CONTROL CIRCUIT FOR GOLF CARTS AND THE LIKE

RELATED APPLICATIONS

This is a continuation-in-part of U.S. patent application Ser. No. 559,107, (now abandoned) and filed Dec. 7, 1983.

BACKGROUND OF THE INVENTION

Field of the Invention

This invention relates to electrical powered vehicles, and it more particularly relates to systems to power vehicles from storage batteries.

Background of the Invention

The regulation of DC current, such as provided by storage batteries, is required for regulating the power of a motor that propels a vehicle, such as a golf cart. It has been proposed to employ current consuming control elements, such as variable or stepping resistances for effecting control of DC power applied to the motor. One regulation system provides shifting the batteries from parallel to series flow circuitry to regulate power input at the motor, and therefore, vehicle speed. None of the known regulation systems overcome power waste in resistance, or they fail to provide a variable speed control for the battery powered vehicles that is economical, safe and reliable but simple to maintain and yet compatible to the driver's natural responses. Also, the charge level greatly varies between several batteries switched between series/parallel in intermediate speed ranges.

Examples of such unsatisfactory regulation systems can be found in the following patents.

In U.S. Pat. No. 3,188,543, the regulation system uses a series/parallel arrangement of batteries for speed control, and a centrifugal switch regulates the speed of the vehicle. A multitude of solenoids gang switch the batteries but these solenoids also switch resistances for actual speed control. This system has many solenoids and complicated parts but the operator yet has little control over vehicle speed.

The U.S. Pat. No. 3,243,678 is similar in circuitry in using the centrifugal switch for speed control, but requires a special motor with compound fields. The special motor is expensive and additionally heavy without any real improvement in constant speed control (easily provided by the driver with the accelerator pedal).

A golf cart regulation system is described in U.S. Pat. No. 3,696,279. Discrete switching of batteries is provided by a cam (50) which leads to electrical and mechanical problems. Only two battery packs (30 and 32) are used, and therefore resistances must provide the intermediate speed control (a power wasting feature).

Of similar result is the golf cart regulation system shown in U.S. Pat. No. 3,818,293. Resistances are required for speed control (note, paralleling resistors only improves heat dissipation, not power conservation). In reverse, battery drain in unbalanced and causes unequal discharging of the batteries.

The regulation system of U.S. Pat. No. 3,984,744 illustrates an improper combination of solenoids and mechanical switching arrangements. The solenoids gang switch the batteries and these solenoids are energized even at series battery connection for higher speed travel. Another power waste example of the prior art.

In the present system, all switching of the batteries into their parallel, parallel/series and series circuits with the motor is provided by electromechanical switches, commonly identified as contactors or solenoids. Importantly, these speed control contactors are so arranged as to be de-energized and hence conserve current at series battery connection for high speed vehicle operation. At parallel and series/parallel battery connection, these speed control contactors provide for equalized battery charging and discharging at high current levels, and during up shifting and down shifting. Further, these speed control contactors are so arranged as to provide circuit disconnectors where any battery is discharged below the minimum voltage necessary to drive the vehicle. With these advantages over the system shown in the mentioned patents, a very minimum number of contactors and other parts are employed in an efficient regulation system with total and comfortable operator speed control.

SUMMARY OF THE INVENTION

In accordance with this invention, there is provided a speed control system or circuit for an electric motor driven vehicle, such as a golf cart. First, second and third battery sources of like potential provide DC power at their respective terminals. Speed control contactors with DPDT switching contacts connect circuitwise the battery output terminals to a DC motor. Each speed control contactor is operated by a solenoid coil at the individual potential of one said battery. The motor adapted to propel the vehicle, has series armature and field windings, and a maximum operating potential equal to the series connected potential of the batteries. The batteries, motor and speed control contactors are interconnected by circuit means so that the solenoid coils of the speed control contactors are (1) de-energized in series battery connection, (2) energized in parallel battery connection, and (3) selectively energized in parallel/series battery connection. The selective energization is accomplished by a relay control means which equalizes current charge levels by using alternate series/parallel connection of the batteries at intermediate vehicle speed. A speed control pedal actuates a switch means for the mentioned de-energized, energized and selectively energized conditions of the solenoid coils for selecting high, low and intermediaate vehicle speeds, respectively.

In other arrangements of the invention, the solenoid coils de-energize at minimum discharge of the batteries, the switch means includes reverse directional vehicle operation at only the low speed operation, contactor failure cannot produce short circuits in the batteries, or explosion and fire hazards, and equal charge and discharge states are provided for all the batteries.

DESCRIPTION OF PREFERRED EMBODIMENT

Figure 1:
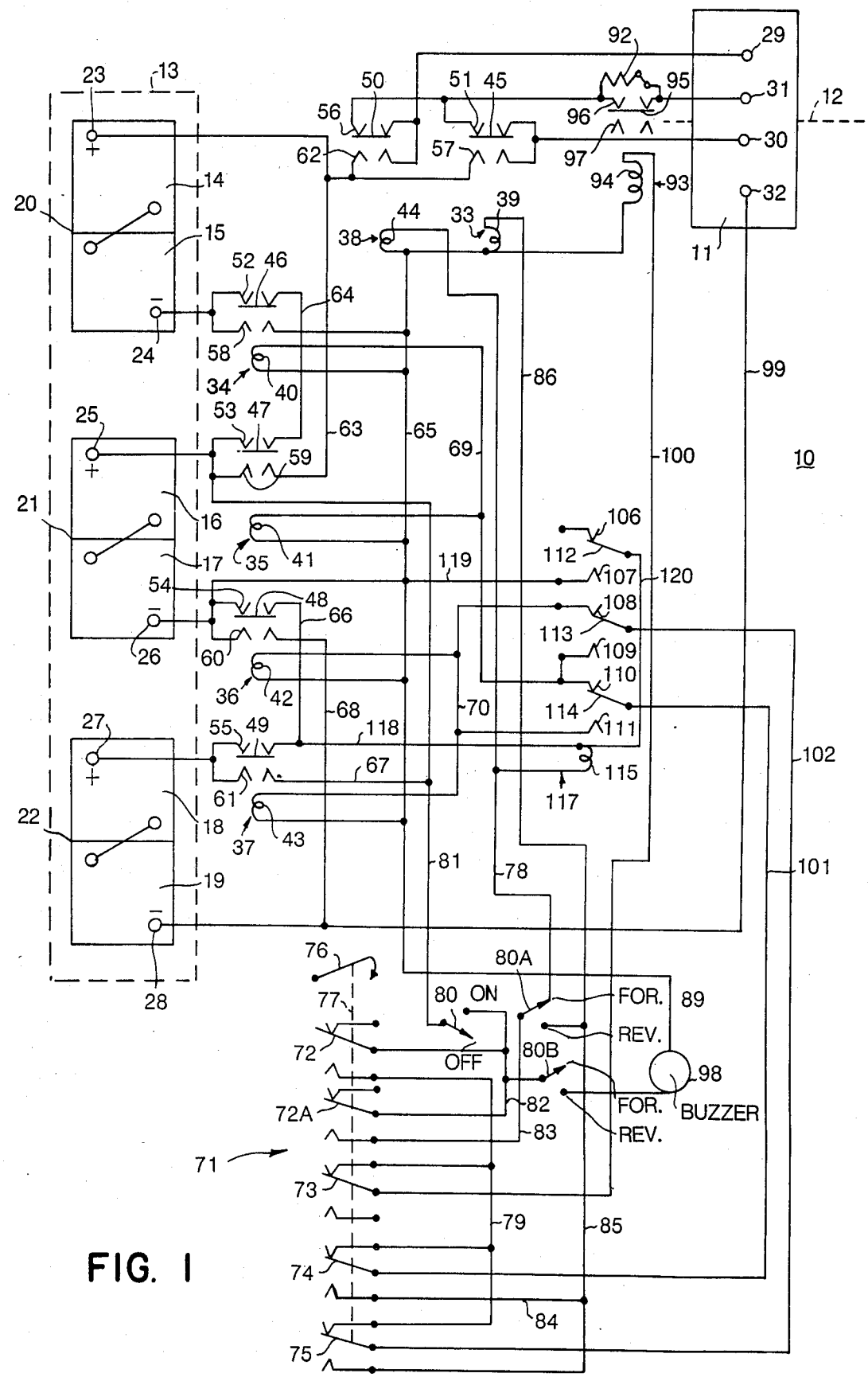
FIG. 1 is a schematic illustrating a preferred embodiment of the present invention in a speed control circuit for an electric DC motor driven vehicle. The drive shaft output from the motor is shown diagrammatically in chain line.

Referring now to FIG. 1 of the drawing, there is shown a speed control system in the circuit 10 for use in propelling an electric motor driven vehicle such as a golf cart, or the like. Although the vehicle is not shown, it is to be understood that the motive power is provided by a DC motor 11 which has an output shaft 12 (shown in chain line) for connection with the wheel driving components of the vehicle.

In vehicles of this nature, the power source will be a battery pack 13. The pack will contain a plurality of like potential batteries for efficient and durable supplying of current to the motor 11. Although the batteries may be of the magnitudes provided by lead acid cell storage types in 6, 12, 24 volts, etc., it is preferred in minimizing costs relative to performance, to employ six batteries 14-19 in three pairs 20-22 of two series connected batteries. At the output terminals 23-28 of any pair, there will be a potential of 12 volts, in series battery connection a terminal output potential of 36 volts, and in series/parallel battery connection an output potention of 24 volts. The batteries can be mounted individually within the vehicle, or on a pullout tray (not shown) for ease in serving or replacement of one or more batteries from the pack 13.

Although a variety of DC motors can be used in the circuit 10, it is preferred that the motor 11 be of the series type with armature windings at terminals 29-30 and field windings at terminals 31-32. To reverse the direction of rotation of the shaft 12, the polarity of only one of the field or armature windings needs to be reversed. In this embodiment, the armature winding terminals 29 and 30 are reversed relative to their connection with the field winding terminal 31. The motor 11 has a maximum operating potential for efficient operation equal to the series connection potential of the pack 13, namely, 36 volts.

Each terminal of the battery pairs 20-22 is associated with one of the speed control contactors 34-37 or with the forward or reverse directional control contactor 33 or 38. These contactors have actuating solenoid cells 39-44, which coils are energized by a DC potential above 10 volts but will be de-energized at a potential less than this magnitude. At DC potentials below 10 volts across the terminals of any battery pair, these batteries are at a severe discharge level and should be immediately recharged to prevent irreversible damage to a lead acid cell battery. Obviously, if batteries of other types are utilized in the pack 13, the minimum potential magnitude at severe discharge will be different, and the solenoid coils are selected to be de-energized at such potential magnitude.

Each speed control contactor 34-37 is preferably of the DPDT variety so that their switch contacts can be arranged with a circuit for placing selectively the battery pairs 20-22 into series, parallel and series/parallel connection with the motor 11. The contactors 34-37 are shown in the de-energized position with their bars 46-49 closing, respectively, the upper pairs of switch contacts 52-55. When the contactors are energized the bars, respectively, close the lower pairs of switch contacts 58-61.

Specifically, when current flows through line 69, speed control contactors 34 and 35 are energized, coils 40 and 41 are actuated and bars 46 and 47 close the lower pairs of switch contacts 58 and 59. The positive terminal 25 of battery 21 is thus connected by line 63 with the positive terminal 23 of battery 20 and the negative terminal 26 of battery 21 is thus connected through line 65 to the negative battery terminal 24 of battery 20. Thusly, batteries 21 and 20 are in parallel.

When current does not flow through line 69, speed control contactors 34 and 35 are de-energized, coils 40 and 41 are not activated, bars 46 and 47 close the upper pairs of switch contacts 52 and 53, as in the drawing, and the positive terminal 25 of battery 21 is connected by line 64 to the negative terminal 24 of battery 20. Now, batteries 21 and 20 are in series.

When current flows through line 70, speed control contactors 36 and 37 are energized, coils 42 and 43 are actuated and bars 48 and 49 close the lower pairs of switch contacts 60 and 61. The positive terminal 27 of battery 22 is thus connected by line 67 with the positive terminal 25 of battery 21 and the negative terminal 28 of battery 22 is thus connected through line 68 to the negative battery terminal 26 of battery 21. As a result, batteries 22 and 21 are in parallel.

When current does not flow through line 70, speed control contactors 36 and 37 are de-energized, coils 42 and 43 are not activated, bars 48 and 49 close the upper pairs of switch contacts 54 and 55, as in the drawing, and the positive terminal 27 of battery 22 is connected by line 66 to the negative terminal 26 of battery 21. Now, batteries 22 and 21 are in series.

It can be seen that when current flows both through line 69 and through line 70, batteries 20, 21 and 22 are all in parallel. When current flows through line 69 but not through line 70, batteries 21 and 20 are in parallel and battery 22 is connected in series with parallel batteries 21 and 22. When current flows through line 70, but not through line 69, batteries 22 and 21 are in parallel and battery 20 is connected in series with parallel batteries 22 and 21. When current flows through neither line 69 nor line 70, as is the situation depicted in FIG. 1, batteries 22, 21 and 20 are connected in series.

Relay control contactor 117 is preferably a small current contactor of a type having a plurality of SPDT switches. Relay control contactor 117 determines whether line 101 or line 102, both from switch 71, connects with line 69 or line 70. If relay control contactor 117 is energized, solenoid coil 115 is activated, switch rotors 112, 113 and 114 close to make contact with switch contacts 107, 109 and 111. Line 101 is now connected with line 70 and line 102 is now connected with line 69. When relay control contactor 117 is not energized, solenoid coil 115 is not actuated, switch rotors 112, 113 and 114 open to make contact with switch contacts 106, 108 and 110, as depicted in FIG. 1. Line 101 is now connected with line 69 and line 102 is now connected with line 70. It can be seen that relay control contactor 117 determines whether line 101 energizes line 69 or line 70, alternately, whether line 102 energizes line 70 or line 69. Thus, when only line 101 is energized the relay control contactor determines whether batteries 21 and 20 are in parallel (relay control contactor de-energized) or whether batteries 22 and 21 are in parallel (relay control contactor energized).

In some situations of close quarters or crowded conditions or for other reasons, the first forward or reverse speed is desired to be a creep low speed. For this purpose a current limiting resistor 92 is in series with the lead to the motor terminal 31. A regulator contactor 93 is used for placing the resistor 92 in shunt of the regulator contacts 96 when the regulator contactor 93 is energized. Contactor 93 has a solenoid coil 94 connected by line 100 to rotor 73 of foot pedal actuated switch 71 and by line 65 to negative battery terminal 26. When contactor 93 is de-energized, bar 95 remains against contacts 96 and current bridges across resistor 92 through the bar. When contactor 93 is energized, bar 95 is moved from upper contacts 96 to lower contacts 97. Current flowing to motor terminal 31 must flow through resistor 92, thereby limiting current to motor 11 and providing a very slow but steady creep speed.

Forward directional control contactor 38 and reverse directional control contactor 33 are preferably of the DPDT variety. When current flows through line 78 and not through line 86, forward control contactor 38 is energized, solenoid coil 44 is actuated and bar 50 closes the lower pair of switch contacts 62. Now, reverse control contactor 33 is not energized, solenoid coil 39 is not actuated, and bar 45 closes the upper pair of switch contacts 51. Current flows from positive terminal 23 of battery 20 to armature winding 29 of the DC motor 11, through to armature winding 30, through upper switch contacts 51 to field winding 31, through to field winding 32, and from field winding 32 of the DC motor 11 through line 99 to negative terminal 28 of battery 22.

When current flows through line 86 and not through line 78, reverse directional control contactor 33 is energized, solenoid coil 39 is actuated and bar 45 closes the lower pair of switch contacts 57. Forward directional control contactor 38 is not energized, solenoid coil 44 is not actuated, and bar 50 closes the upper pair of switch contacts 56. Current flows from positive terminal 23 of battery 20 to armature winding 30 of the DC motor 11, through to armature winding 29, through upper switch contacts 56 to field winding 31, through to field winding 32 and from field winding 32 of the DC motor 11 through line 99 to negative terminal 28 of battery 22.

Directional control switch 80A is preferably of the SPDT variety having a forward position and a reverse position. In the forward position switch 80A provides connection from line 83 of foot pedal switch 71 to line 78, but not to line 86. In the reverse position switch 80A provides connection from line 83 of switch 71 to line 86, but not to line 78. It can be seen that by use of the directional control switch 80A, current from line 83 of switch 71 will flow either to line 78 or to line 86, but not to both. Thus it can be seen that by switch 80A either forward directional control contactor 38 will be energized or reverse directional control contactor 33 will be energized, but not both at the same time.

When directional control switch 80A is in the reverse position, line 83 of switch 71 is also connected through line 85 to the lower contacts of rotors 74 and 75 of switch 71. As will be seen below, this provides a blockout current in the reverse mode which keeps the speed control contactors from becoming de-energized and thus batteries 22, 21 and 20 are maintained continuously in parallel for reverse mode operation.

Buzzer control switch 80B is of the SPDT variety (actually part of switch 80A) having a forward position and a reverse position. In the forward position no current flows through switch 80B. In the reverse position current flows through switch 80B, through buzzer 98 and returns by line 89 to negative terminal 26 of battery 21. Thus, an alarm is provided when operating in reverse mode.

Switch 71 is of the foot pedal type having a plurality of SPDT level sections 72, 72A, 73–75 that are progressively moved stepwise by level from the normally open position in FIG. 1 to a downward closed position as the foot pedal 76 is depressed by a mechanical connection shown as the chain line 77. The section moveable elements or rotors of the switch 71 are shown in the "off" position. In that position none of the solenoid coils can be energized.

An on-off control switch 80 is employed in association with switch 71. Switch 80 is of the SPDT type having an "on" and an "off" position. In the "on" position switch 80 provides connection via lines 81 and 82 from positive terminal 25 of battery 21 to rotors 72 and 72A of switch 71 and to buzzer control switch 80B. Assume in the following descriptions that the on-off switch 80 is in the "on" position.

First of all, if the buzzer control switch 80B is in the "reverse" position, the buzzer control circuit is closed and the buzzer is activated.

As long as speed control pedal 76 is elevated (not depressed) the circuits remain open supplying the speed control contactors, the relay control contactor, the regulator contactor, the forward directional control contactor, and the reverse directional control contactor.

Depressing pedal 76 to the first forward position moves rotor 72 to its closed position and applies current through line 79 and through open rotors 73, 74 and 75 of switch 71 to lines 100, 101 and 102. The regulator contactor and both speed control contactors are energized. The bar of the regulator contactor does not bridge the current limiting resistor and batteries 22, 21 and 20 are placed in parallel.

Depressing pedal 76 to the second forward position moves rotor 72A to its closed position. Power is supplied through line 83 and through direction control switch 80A to either line 78 or line 86. Depending upon position of switch 80A, either the forward control contactor 38 or the reverse control contactor 33 will be energized, closing the circuit between positive battery terminal 23 and motor 11 and causing the motor to operate in either forward or reverse mode at a creep low speed provided by the power from batteries 22, 21, and 20 in parallel, the current being further limited by resistor 92 in series with motor 11.

Depressing pedal 76 to its third forward position moves rotor 73 to its closed position. No current flows through line 100. The regulator contactor is now de-energized and the motor operates in forward or in reverse mode at the low speed provided by batteries 22, in reverse mode at the low speed provided by batteries 22, 21 and 20 in parallel.

Depressing pedal 76 to its fourth forward position moves rotor 74 to its closed position. Line 101 will no longer receive current from line 79, but will receive current from line 85 if directional control switch 80A is in the reverse position. If line 101 continues to receive current, no speed control contactor will be de-energized and the batteries will remain in parallel. As a result, the motor will continue to operate in low speed, as long as the mode is in reverse, notwithstanding depressing pedal 76 to its fourth forward position. If line 101 no longer receives current in forward mode, either line 69 or line 70 will not receive current, depending upon whether relay control contactor 117 is energized or not. In either situation, as illustrated previously, one battery will be placed in series with the other two batteries, which remain in parallel. Power to motor 11 will be increased and the motor will operate at an intermediate speed.

When pedal 76 is fully depressed to its fifth forward position, rotor 75 moves to its closed position. Line 102 will no longer receive current from line 79, (but will receive current from line 85 if direction or control switch 80A is in the reverse position). If line 102 continues to receive current no speed control contactor will be de-energized and the batteries will remain in parallel. As a result the motor will continue to operate at low speed, as long as the mode is in reverse, notwithstanding depressing pedal 76 to its fifth fully depressed position. If line 102 no longer receives current in forward mode, neither line 69 nor line 70 will receive current, since line 101 already is not receiving current. All speed control contactors will be de-energized. Batteries 22, 21 and 20 will be placed in series. Motor 11 will receive maximum power from the batteries and will operate at forward maximum high speed.

Also when pedal 76 is fully depressed and directional control switch 80A is in the forward position, speed control contactor 36 is de-energized and the circuit containing relay control contactor 117 will be closed. Current will flow to relay control contactor 117 via line 78 and return to negative battery terminal 26 via line 118 and line 66 and contactor bar 48 closing the upper pair of switch contacts 54. Relay control contactor 117 will be energized. Through closed relay switches 113 and 114, line 102 will now connect with line 69 and line 101 will now connect with line 70. Also, line 120 will now connect with line 119 through closed latching switch 112 to negative battery terminal 26. A circuit is now closed from line 78 through relay control solenoid 115, line 120 and line 119 to negative battery terminal 26 independently of whether speed control contactor 36 remains de-energized. Until current ceases in line 78, either by turning the on-off control switch 80 to "off" or by switching the directional control switch 80A to reverse, or by releasing pedal 76 to its first forward position thereby allowing rotor 72A to return to its closed position, relay control contactor 117 will remain energized. The result is that at intermediate speed, battery 22 will be placed in series with batteries 21 and 20, which will be in parallel.

When relay control contactor 117 is de-energized by any of the above means, one of which always obtains at start up, battery 20 is placed in series with batteries 21 and 22, which are in parallel, at intermediate speed. This capacity to select between batteries 20 and 22 being placed in parallel with battery 21 at intermediate speed serves to equalize the charge on the batteries during operation.

When the battery pairs 20-22 are in parallel, as in creep low and normal low (either forward or reverse) operation, the battery with the higher charge provides proportionately more current until the charges across the pack 13 becomes normalized. Thus, instead of the unequal battery charges getting progressively worse, the present circuit system insures normalizing of the charges in all batteries 14-19.

It should be noted that all control circuits, i.e., the speed control circuits, the relay control circuit, the forward and reverse direction control circuits, the resistor regulator circuit and the buzzer circuit, are powered by battery 21, which is also the one battery that always operates in parallel during intermediate speed. This arrangement enhances the process of equalization of the battery charges during operation.

A careful review of the present circuit 10 will disclose that should a contactor fail, such as by solenoid coil burnout or sticking contacts, none of the batteries can be short-circuited so as to cause a fire or potential explosion.

When the switch 80 is in the off position, all contactors are de-energized. In this condition the pack 13 can be removed for servicing or the batteries subjected to charging.

From the foregoing, it is clear that the described circuit is simple with an economy in parts and maintenance, safe in operation by normal driver responses, and the battery pack is compatible with the usual golf cart chargers. Certain changes or alterations can be made in this circuit without departing from the spirit of this invention. These changes are contemplated by and are within the scope of the appended claims which define this invention. Additionally, the present description is intended to be taken as an illustration of this invention.

What is claimed is:

1. A Speed control circuit for an electric motor driven vehicle such as a golf cart, comprising:
   (a) first, second and third battery sources of like potential to provide DC power at their output terminals;
   (b) speed control contactors with DPDT contacts connected circuitwise with the terminals, of said first, second and third batteries; each said speed control contactor operated by a solenoid coil at the individual potential of one said battery; a DC motor for propelling said vehicle and having armature and field windings of a maximum operating potential equal to the series connected potential of said batteries;
   (c) circuit means interconnecting said motor, batteries and speed control contactors for connecting (1) in series said batteries with said motor when said solenoid coils are de-energized, (2) in parallel said batteries with said motor when all said solenoid coils are energized, and (3) in series/parallel said batteries with said motor when only some of said solenoid coils are energized;
   (d) a speed control pedal actuating a switch means for selectively (1) energizing all said solenoid coils for low speed motor operation, (2) energizing only some of said solenoid coils for intermediate speed motor operation, and (3) de-energizing solenoid coils for high speed motor operation; and
   (e) relay control means for activating said solenoid coils of said speed control contactors responsive to selected positions of said speed control pedal and said relay control means providing for different battery combinations in series/parallel in the intermediate speed motor operation whereby the charge level in said batteries remains substantially uniform.

2. The speed control circuit of claim 1 wherein said motor has a maximum operating potential of 36 volts.

3. The speed control circuit of claim 1 wherein a regulator contactor is connected to said switch means to provide a creep speed less than low speed motor operation, said regulator contactor having DPST contacts in series with said field windings of said motor, and a current limiting resistor in shunt of said regulator contacts when said regulator contactor is energized, said regulator contactor having a regulator solenoid energized by said switch means only for creep speed whereby said limiting resistor prevents arcing at vehicle starts under heavy loads and promotes equalizing the charges among the parallel connected batteries.

4. The speed control circuit of claim 1 wherein said switch means is in combination with a SPDT directional control switch connected in said circuit means with forward and reverse directional control contactors having polarity reversing contacts in series with said armature windings of said motor, and said directional control switch means providing a block out potential on said speed control contactors whereby said motor can operate in reverse only at low or creep speeds.

5. The speed control circuit of claim 3 wherein said switch means is in combination with a SPDT directional control switch connected in said circuit means with forward and reverse directional control contactors having polarity reversing contacts in series with said armature windings of said motor, and said directional control switch means providing a block out potential on said speed control contactors whereby said motor can operate in reverse only at low or creep speeds.

6. The speed control circuit of claim 4 wherein said motor has field windings and armature windings connected in series by said forward directional control contactor for forward motor operation, and for reverse motor operation said polarity reversing contacts of said reverse directional control contactor reverses the armature windings relative to said field winding while maintaining the series connection of said field and armature windings.

7. The speed control circuit of claim 1 wherein said relay control means comprises: a small current relay contactor (1) having SPDT relay control switches connected circuitwise with the speed control contactors and the switch means actuated by the speed control pedal such that the opening and closing of the relay control switches alternates the batteries placed in parallel for parallel/series operation at intermediate motor speed, (2) having an SPDT relay control latching switch, and (3) having a small current relay control solenoid connected circuitwise with the battery sources through the switch means actuated by the speed control pedal, the relay control latching switch and contacts of a speed control contactor, such that said relay control solenoid becomes energized when the motor operates at high speed and becomes de-energized when the motor becomes de-energized.

* * * * *